July 18, 1967 A. A. STRICKER ETAL 3,332,912

COMPONENT WITH STANDOFF AND METHOD OF MAKING SAME

Filed Sept. 17, 1965 3 Sheets-Sheet 1

INVENTORS
ALFRED A. STRICKER
WILLIAM J. WALKER

BY

ATTORNEY 3,331,912
COMPONENT WITH STANDOFF AND METHOD OF MAKING SAME

Alfred A. Stricker and William J. Walker, Wappingers Falls, N.Y., assignors to International Business Machines Corporation, Armonk, N.Y., a corporation of New York Filed Sept. 17, 1965, Ser. No. 488,010
16 Claims. (Cl. 174—50.52)

This invention relates to components having connecting elements, as for example, printed-circuit modules formed with liquid backseal material and having connecting pins formed with standoffs and coated with solder for connection to a printed-circuit card.

Standoffs are projections on the pins and they abut the printed-circuit card to maintain the module spaced from the card surface. The resulting clearance space between the module and the card is necessary to permit soldering and flux cleaning operations involved in bonding the module pins to the printed-circuit conductive lands on the card.

The use of standoffs in conjunction with the liquid backseal material causes a serious problem of solder flow inhibition on the pins by the backseal material. This problem occurs because the standoffs are formed by swaging the pins so as to result inevitably in longitudinal channels in the pin surfaces. The liquid backseal material is drawn upwardly through these channels by capillary action to contaminate the solder on the standoffs and the outer ends of the pins. This contamination, if permitted to occur, would render the module fatally defective so as to prevent the utilization of a swaged standoff in a module formed with a liquid backseal material.

It is therefore a primary object of the present invention to provide a novel module or other component of the character described and wherein the pins or other connecting elements are provided with means for preventing the flow of the backseal or other liquid material from flowing along the pins to contaminate the solder or other bonding medium.

This means is disclosed in the preferred embodiment of the invention in the form of an annular rib swaged on the pins during the standoff swaging operation and located adjacent the standoff between the latter and the component body to prevent the liquid backseal material from flowing from the component body to the solder on the standoffs and the outer portions of the pins.

Another major object of the present invention is to provide a novel method of making a component having an extending connecting element for attachment to an assembly member with the component spaced from the latter. This novel method is disclosed in the preferred embodiment as comprising the steps of swaging on the connecting element a standoff spaced from the component body and also swaging on the connecting element between the standoff and the component body a means for preventing the flow of liquid material along the element. Solder is applied to the connecting element, and a liquid sealing material is applied to the component body. The flow preventing means blocks the liquid material from flowing along the connecting element to contaminate the solder thereon.

Still another object is to improve the swaging operation which forms the standoffs and the flow blocking ribs by utilizing for the pins a copper wire having an outer tin coating formed over an inner nickel coating. The tin coating acts as a lubricant to permit the swaging tools to form the desired configuration and further permits the pins to be readily retinned after the swaging operation. The nickel coating prevents the formation of a copper-tin intermetallic surface which would adversely affect the solderability.

A further object is to provide an improved standoff construction which may be economically fabricated, which accurately spaces and locates the module with respect to the printed-circuit card on which the module is mounted, and which does not substantially reduce the strength of the pin.

The foregoing and other objects, features and advantages of the invention will be apparent from the following more particular description of a preferred embodiment of the invention as illustrated in the accompanying drawings.

Figure 1:
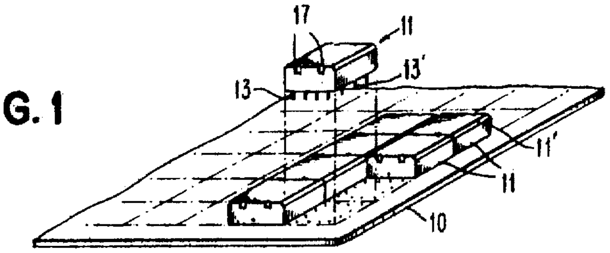
FIG. 1 is a perspective view of a printed-circuit card having mounted thereon a plurality of modules in accordance with the present invention.

Referring now to the drawings in more detail, in FIG. 1 the reference numeral 10 indicates generally a printed-circuit board or so-called "daughter card" upon which are mounted a plurality of modules 11 constructed in accordance with the present invention. Each of the modules 11 is provided with a plurality of downwardly extending connector pins 13', 13 which are soldered to and make electrical contact with the printed-circuit conductive lands (not shown) which may be formed on either or both surfaces of card 10.

Figure 4:
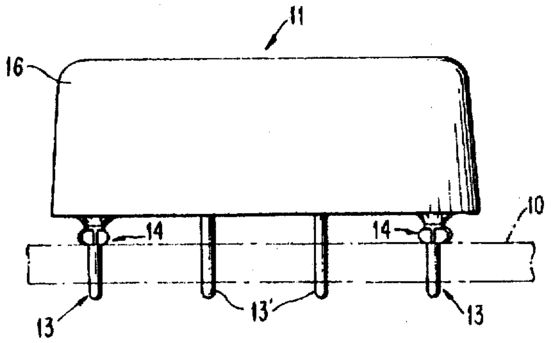
FIG. 4 is an elevational view of a module mounted on the printed-circuit card and showing the clearance space therebetween as provided by the standoffs in accordance with the present invention.

The soldering and flux cleaning operations involved in bonding module pins 13', 13 to the printed-circuit conductive lands on card 10 require a clearance space between the lower surface of module 11 and the upper surface of card 10, as best seen in FIG. 4. In order to provide this clearance space the four corner pins 13 are provided along their intermediate portions with standoffs 14 which abut the upper surface of card 10 so as to maintain modules 11 at the required clearance height above the upper surface of card 10.

Each module 11 is approximately one-half inch square and contains several logic circuits. With this arrangement a "daughter card" with dimensions of 8½" by 11" may be provided with several thousand logic circuits. Each module 11 is provided with a chamfered edge 11' which indicates the proper orientation of the module when it is assembled on card 10.

Figure 2:
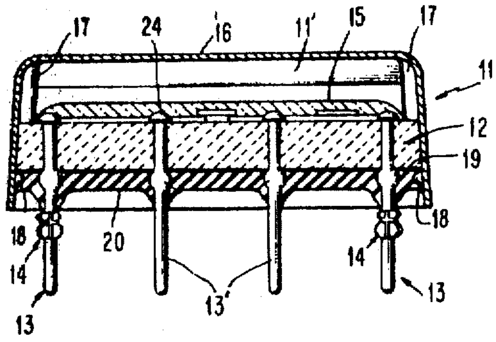
FIG. 2 is a vertical sectional view through one of the modules.

As best seen in FIG. 2, each module 11 comprises a ceramic substrate 12 having a so-called "hybrid" circuit on the upper surface thereof. The circuit is protected by a conformal non-stress coating 15 and the entire upper surface of substrate 12 is enclosed by a metal can 16. The latter is provided with four indentations 17 to position substrate 12 relative to can 16 after which can 16 is crimped or indented as indicated at 18 to secure can 16 and module 11 in assembled relation. With ceramic substrate 12 thus secured to can 16, the assembly is inverted with pins 13', 13 extending upwardly and a primer coat 19 is applied to the normally lower surface of substrate 12 to adapt it to receive a backseal material 20 such as silicone rubber, the composition and properties of which will be described in more detail below.

Figure 3:
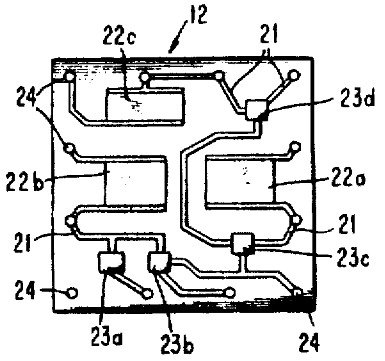
FIG. 3 is a top plan view of the module substrate showing a typical hybrid circuit thereon.

In FIG. 3 there is shown a typical hybrid circuit on the upper surface of ceramic substrate 12. The conductive lands are indicated at 21. The reference numerals **22*a* to 22*c* inclusive designate three screened paste resistors. The reference numerals 23*a* to 23*d* inclusive designate three semiconductor chips which may be either diodes or transistors. The upper headed portions of pins 13', 13 are indicated at 24**.

Figure 5:
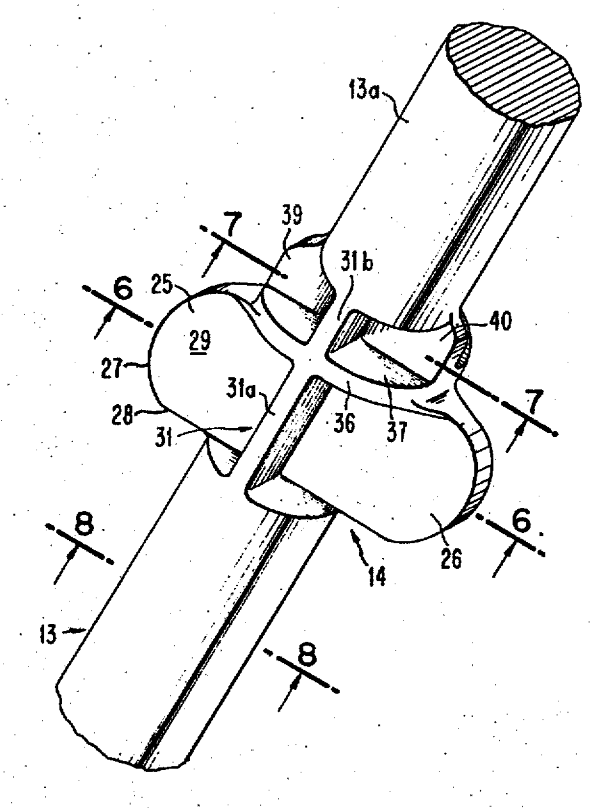
FIG. 5 is an enlarged perspective view of a portion of one of the module pins and shows the standoff formed thereon.

Referring now to FIG. 5, there is shown an enlarged perspective view of one of the standoffs indicated generally by the reference numeral 14. Each standoff 14 is cold formed in an intermediate portion of a respective one of the four corner pins 13 by swaging dies described below in connection with FIGS. 10 and 13.

Standoff 14 comprises a pair of radially outwardly extending ribs or projections 25, 26 each having an arcuate outer periphery 27 and a horizontal planar lower surface 28. The latter is adapted to abut against the upper surface of the printed-circuit "daughter card" 10 and its location longitudinally of pin 13 may be modified so as to vary the height of module 11 above card 10 as may be required in accordance with the particular construction of the latter.

Figure 7:
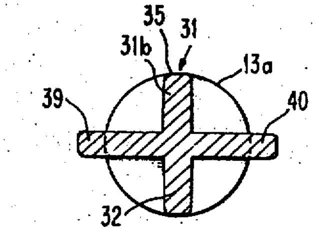
FIG. 7 is a transverse sectional view taken substantially on line 7—7 of FIG. 5.
Figure 6:
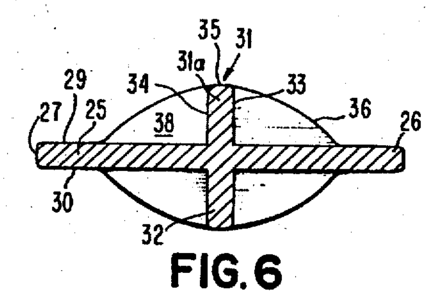
FIG. 6 is a transverse sectional view through the standoff and is taken substantially on line 6—6 of FIG. 5.

As best seen in FIG. 6, each of the projections 25, 26 is provided with a pair of parallel vertical lateral surfaces 29, 30 so that projections 25, 26 are relatively thin in cross-section as compared with the original diameter of pin 13. In order to compensate for the loss in strength and rigidity resulting from this reduction in cross-sectional area each standoff 14 is provided with a pair of vertically extending longitudinal ribs 31, 32 located substantially in a plane perpendicular to the plane of projections 25, 26. Each of the ribs 31, 32 is provided with a pair of parallel vertical lateral surfaces 33, 34 and the thickness of each rib 31, 32 may be substantially equal that of the projections 25, 26. The outer edge 35 of each of the ribs 31, 32 is preferably coextensive with the circular periphery of pin 13 as best seen in FIG. 7.

Integral with the upper portions of ribs 25, 26 and extending in a horizontal plane perpendicular to the plane of the latter is a radially outwardly projecting annular rib 36 having a substantially eliptical contour, as best seen in FIG. 6. Rib 36 serves to prevent the liquid backseal material 20 from flowing along pins 13 to contaminate the solder thereon, as will be explained in more detail below. Rib 36 is provided with horizontal parallel upper and lower surfaces 37, 38 and is of a thickness substantially equal that of projections 25, 26 and ribs 31, 32. It will be seen in FIG. 5 that rib 36 intersects ribs 31, 32 so that each of the latter comprises a larger portion **31*a* extending below rib 36 and a smaller portion 31*b* extending thereabove. Coplanar with projections 25, 26 and of equal thickness therewith are a pair of sections 39, 40 extending from the upper surface 37 of rib 36 to the circular non-swaged upper portion 13*a* of pin 13**.

Figure 9:
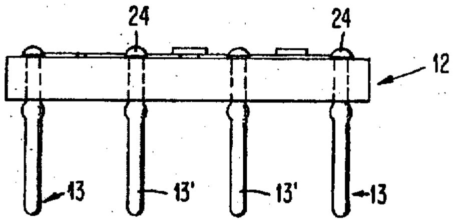
FIG. 9 is a side elevational view of the module substrate having pins inserted therein but before the standoff swaging operation.

In FIGS. 9 to 12 inclusive there are shown the successive method steps involved in making module 11 in accordance with the present invention. FIG. 9 shows ceramic substrate 12 with a hybrid circuit on the upper surface thereof and pins 13', 13 mounted therein and extending downwardly from the lower surface thereof. Pins 13', 13 have been tinned by submersion in a solder bath (not shown). In FIG. 9 the pins are shown before the swaging operation which is disclosed in FIG. 10. In the latter figure each of the corner pins 13 is shown as having a standoff 14 formed in an intermediate portion thereof by a pair of swaging dies shown at 45, 46.

Figure 10:
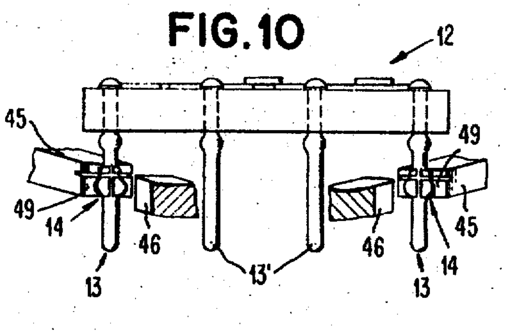
FIG. 10 is a side elevational view of the module substrate and shows schematically the swaging operation which cold forms the standoffs in the four corner pins.
Figure 13:
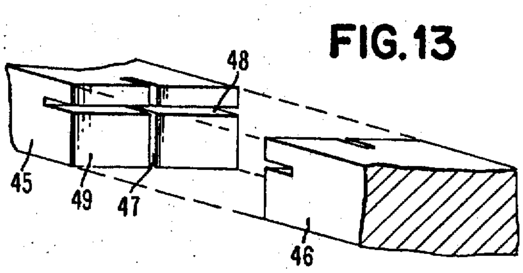
FIG. 13 is a perspective view of the operative portions of the swaging jaws which cold form the standoff structures in the four corner pins.

The operative cold forming surfaces of dies 45, 46 are shown in more detail in FIG. 13, each being provided with a vertical cavity 47 for forming vertical ribs 31, 32 and a horizontal cavity 48 for forming rib 36. Lateral projections 25, 26 are formed between the opposite planar end faces 49 of dies 45, 46. During the swaging operation each pair of dies 45, 46 is moved into operative engagement with a respective one of corner pins 13 by any conventional die actuating mechanism well-known in the art. As shown in FIG. 10 dies 45, 46 extend at an angle with respect to the edges of substrate 12 so as to clear the intermediate pins 13'.

Figure 11:
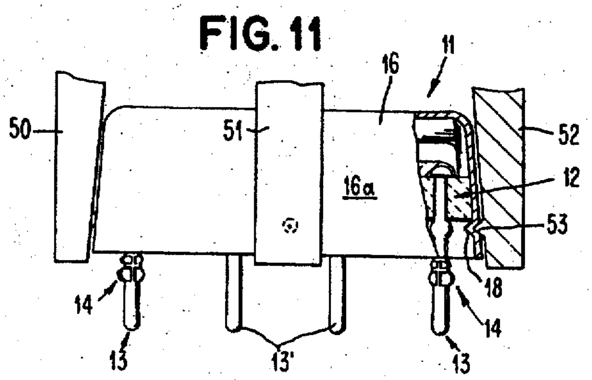
FIG. 11 is a side elevational view, partly in section, showing schematically the step of crimping to the substrate the metal can which encloses the upper surface of the latter.

Referring now to FIG. 11, there is shown the step of crimping metal can 16 in secured assembled relation on substrate 12. Can 16 may be placed onto substrate 12 either manually or by well-known automatic machinery, after which indentations 18 are crimped in the side walls **16*a* of can 16 by four crimping jaws of which three are indicated at 50, 51, 52. The fourth crimping jaw is located behind jaw 51 and is not seen. Indentations 18 engage the lower outer peripheral edge of substrate 12 to prevent the latter from being displaced downwardly through the lower open end of metal can 16**.

Figure 12:
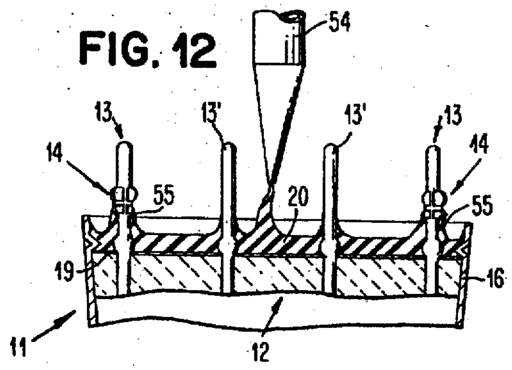
FIG. 12 is a vertical sectional view showing schematically the step of dispensing the liquid backseal material onto the lower surface of the substrate with the module in inverted position.

After can 16 and substrate 12 are thus assembled, module 11 is inverted as shown in FIG. 12 so that pins 13', 13 project upwardly and the normally lower open end of can 16 faces upwardly so as to be accessible for dispensing thereinto the liquid backseal material 20. The normally lower surface of ceramic substrate 12 is first coated with primer 19 and then backseal material 20 in viscous liquid form is dispensed onto primer 19 by a dispensing nozzle indicated schematically at 54.

Before backseal material 20 hardens and while it is still fairly fluid, it tends to climb up pins 13', 13 due to surface adhesion with the latter, as indicated at 55. When liquid backseal material 20 reaches standoffs 14 this climbing action is increased due to the capillary effect of the V-shaped channels formed by the intersecting planes of the lateral surfaces 29, 30 of standoff projections 25, 26 and the surfaces 33, 34 of vertical ribs 31, 32. That is, the V-shaped channels formed at the intersections of these wall surfaces provide a capillary action which causes the liquid backseal material 20 to climb upwardly through these channels so as to envelop standoffs 14 and the upper portions **13*a* of pins 13**.

This capillary climbing action of backseal material 20, if permitted to occur, would render module 11 defective for the following reason.

Before the standoff swaging operation pins 13', 13 were dipped into a solder bath (not shown) so as to coat these pins as well as standoffs 14 thereon with solder which is subsequently reflowed during the operation of bonding pins 13', 13 to the conductive lands of the printed-circuit "daughter card" 10. If backseal material 20 were permitted to flow onto these soldered portions of the pins, the solder would be contaminated so as to obstruct the formation of a proper electrical connection between pins 13 and the conductive lands of card 10.

It has been discovered that by providing the annular elliptical radially projecting transverse rib 36 the liquid backseal material 20 is blocked from climbing upwardly through the capillary channels and hence the solder on standoff projections 25, 26 and the outer portions 13a of pins 13 are maintained free of contamination by backseal material 20. Rib 36 thus makes possible the use of the economical, strong and accurate standoff construction 14 in conjunction with a module construction involving backseal material 20.

Figure 8:
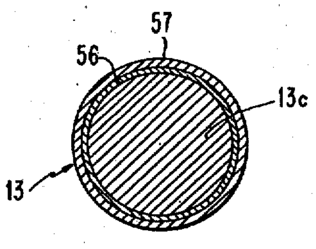
FIG. 8 is a transverse sectional view through the pin taken substantially on line 8—8 of FIG. 5, the nickel and tin coatings being shown with exaggerated thickness.

In FIG. 8 is shown a preferred coating structure for copper pins 13 and which may also be employed for the intermediate pins 13'. Each pin 13 comprises a wire segment 13c formed of a zirconium copper alloy. An inner coating 56 of nickel approximately 0.0001 inch to 0.0002 inch thick is first applied to the wire 13c. An outer coating 57 of tin approximately 0.0002 inch to 0.0004 inch thick is then applied over nickel coating 56.

The tin coating 57 acts as a metallurgical lubricant during the swaging operation and provides a surface capable of being retinned readily after the swaging operation. The nickel coating 56 prevents the formation of a copper-tin intermetallic surface which would adversely affect solderability.

Although substrate 12 may be formed of other ceramic materials, a composition of at least 94% to 99% alumina is preferred because of its high thermoconductivity, excellent electrical insulative properties and stability at high temperatures. The preferred respective coating materials are of the silicone type which is here defined to be a linear dimethyl siloxane polymer although other material may be used.

Conformal coating 15 is required to be a chemically inert gel like material that does not harden to stress the active elements at temperatures in which the module is to be used. A particular material that may be employed as conformal non-stress coating 15 is manufactured and sold by the Dow Corning Corporation under the trademark "Sylgard." In order to allow the material to spread evenly over all the components on the module, the module is first heated to a temperature of approximately 150° C. at the time the conformal coating 15 is applied. Primer coat 19 and the silicone rubber backseal material 20 are applied without any heat treatment although the curing step for the rubber backseal 20 is according to a preferred process as will be more thoroughly described below.

The silicone rubber backseal material 20 is of the dimethyl siloxane polymer type. After curing this rubber should have a durometer hardness of approximately 60 with a variation of no more than +10 or −5. Such a rubber that may be employed is one that results from the condensation of a silanol terminated polymethyl-siloxane groups with tetraethylorthosilicate. To catalyze the reaction, some water vapor should be present and a dibutyl tin dilaurate is added in the amount of approximately 0.2%–0.5% by weight. Such rubbers may be obtained commercially.

The primer material 19 is formed of a silicone with a volatile carrier base and includes the following percentages by weight of materials:

| | Percent |
|---|---|
| Acetone | 34 |
| Isopropyl alcohol | 28 |
| Butyl alcohol | 4 |
| Toluene | 19 |
| Silicone | 13 |

The respective percentages may be varied providing the percentage of silicone is maintained in the range of 12%–18%.

After the primer 19 is applied, it is allowed to set for one to two hours at room temperature in an atmosphere of 50% relative humidity. The silicone rubber backseal 20 is then applied and cured for two to ten hours at room temperature with a relative humidity of 50%, then for one hour at 40° C. and ambient humidity, then for one hour at 65° C. and 60% relative humidity, and finally for two to three hours at 160° C. and ambient humidity. This process has been found to provide the optimum curing and debubbling of the backseal 20.

It will be understood that although for purposes of illustration the subject invention is disclosed herein as embodied in a printed-circuit module with standoff means for mounting it to a printed-circuit "daughter card," the subject invention may also be utilized in any component having a standoff on a connecting element and formed with a liquid material which might flow along the connecting element to adversely affect the bonding or connecting characteristics of the latter.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of making a component having an extending connector element for attachment to an assembly member with the component spaced from the latter, said method comprising the steps of forming on said connector element a standoff spaced from said component, forming on said connector element a means for preventing the flow of liquid material along the element, applying a bonding material to said connector element, and dispensing a liquid material onto said component, whereby said means prevents said liquid material from flowing along said connecter element to contaminate the bonding material thereon.

2. A method of making a component having pins for attachment to a member with the component spaced from the latter, said method comprising the steps of cold forming on each of said pins a standoff spaced from said component, cold forming on each of said pins between said standoff and said components a means for preventing the flow of liquid material along the pins, applying solder to said pins, and applying a liquid sealing material to said component, whereby said means prevents said liquid sealing material from flowing along said pins to contaminate the solder thereon.

3. A method of making a module having pins for attachment to a printed-circuit card with the module spaced from the latter, said method comprising the steps of swaging on each of said pins a standoff spaced from said component, swaging on each of said pins between said standoff and said component a means for preventing the flow of liquid material along the pins, applying solder to said pins, and applying a liquid backseal material to said module, whereby said means prevents said liquid backseal material from flowing along said pins to contaminate the solder thereon.

4. A method of making a component having a connecting element for attachment to an assembly with the component spaced from the latter, said method comprising the steps of forming on said connecting element a standoff spaced from said component, forming on said connecting element an annular projection for preventing the flow of liquid material along the element, applying a bonding material to said connecting element, and applying a liquid material to said component, whereby said annular projection prevents said liquid material from flowing along said element to contaminate the bonding material thereon.

5. A method of making a module having extending connecting pins for attachment to a printed-circuit card with the module spaced from the latter, said method comprising the steps of swaging on each of said connecting pins a standoff spaced from said module to provide longitudinal channels in said pins, swaging on said connecting pins between said standoff and said module an annular laterally-extending rib for preventing the flow of liquid material through said channels, applying solder to said connetcing pins, and dispensing a liquid backseal material onto said module, whereby said rib prevents said liquid backseal material from flowing along said channels to contaminate the solder on said pins.

6. A method of making a component having a connecting element extending outwardly therefrom for attachment to an assembly member with the component spaced from the latter, said method comprising the steps of forming on said connecting element a standoff spaced from said component, forming on said connecting element a means for preventing the flow of liquid material along the element, applying a bonding material to the outer portion of said connecting element, orienting said component with said element extending upwardly, and applying a liquid material to said component, whereby said means prevents said liquid material from flowing up said element to contaminate the bonding material on the upper outer portion thereof.

7. A method of making a component having a connecting element extending outwardly therefrom for attachment to an assembly member with the component spaced from the latter, said method comprising the steps of cold forming on said connecting element a standoff spaced from said component, cold forming on said connecting element between said standoff and said component an annular laterally-projecting rib for preventing the flow of liquid material along the element, applying a bonding material to the outer portion of said connecting element, orienting said component with said element extending upwardly, and applying a liquid material to said component, whereby said rib prevents said liquid material from flowing up said element to contaminate the bonding material on the upper outer portion thereof.

8. A method of making a component having pins for attachment to an assembly member with the component spaced from the latter, said method comprising the steps of swaging on each of said pins a standoff spaced from said component, swaging on each pin between said standoff and said component a laterally projecting means for preventing the flow of liquid material up the pin, applying solder to said pins, orienting said component with said pins extending upwardly, and applying a sealing material to said component, whereby said means prevents said sealing material from flowing up said pins to contaminate the solder thereon.

9. A method of making a module having pins for attachment to a printed-circuit card with the module spaced from the latter, said method comprising the steps of swaging on each of said pins a standoff spaced from said module and having radially-extending projections forming longitudinal channels therebetween, swaging on each pin between said standoff and said module a radially projecting annular rib for preventing the flow of liquid material through said channels, applying solder to said pins, orienting said module with said pins extending upwardly, and dispensing a backseal material onto said module, whereby said annular rib prevents said backseal material from flowing up said channels to contaminate the solder on the pins.

10. A component for attachment to an assembly member with the component spaced from the latter, said component comprising a body, a plurality of pins extending from said body, a standoff on each of said pins and spaced from said body, each pin having means for preventing the flow of liquid material along the pin, solder on said pins, and a sealing material on said body, whereby said means prevents said sealing material from flowing along said pins to contaminate the solder thereon.

11. A component for attachment to an assembly member with the component spaced from the latter, said component comprising a body, a plurality of pins extending from said body, a standoff on each of said pins and spaced from said body, said standoff having radially projecting ribs with channels therebetween, each pin having between said standoff and said body a laterally projecting means for preventing the capillary flow of liquid material through said channels, solder on said pins, and a sealing material on said body, whereby said projecting means prevents said sealing material from flowing through said channels to contaminate the solder on the pins.

12. A module for attachment to a circuit card with the module spaced from the latter, said module comprising a substrate, a plurality of pins extending downwardly from said substrate, a standoff on each of said pins and spaced from said substrate, each pin having means for preventing the flow of liquid material along the pin, solder on said pins, a can enclosing the upper surface of said substrate, and a backseal material enclosing the lower surface of said substrate, whereby said means prevents said backseal material from flowing along said pins to contaminate the solder thereon.

13. A module for attachment to a circuit card with the module spaced from the latter, said module comprising a substrate, a plurality of pins extending downwardly from said substrate, a standoff on each of said pins and spaced from said substrate, each pin having between said standoff and said substrate a laterally projecting annular means for preventing the flow of liquid material along the pin, solder on said pins, a metal can enclosing the upper surface of said substrate, and a backseal material enclosing the lower surface of said substrate, whereby said laterally projecting annular means prevents said backseal material from flowing along said pins to contaminate the solder thereon.

14. A module for attachment to a circuit card with the module spaced from the latter, said module comprising, a substrate, a plurality of pins extending downwardly from said substrate, a standoff on each of said pins and spaced from said substrate, each standoff having a plurality of radially projecting ribs with longitudinal channels therebetween, each pin having between said standoff and said substrate a radially projecting rib for preventing the capillary flow of liquid material through said channels, solder on said pins, a can enclosing the upper surface of said substrate, and a backseal material enclosing the lower surface of said substrate, whereby said radially projecting rib prevents said backseal material from flowing through said channels to contaminate the solder on said pins.

15. A module as recited in claim 14 wherein each of said pins comprises a segment of a copper alloy wire having on the surface thereof an inner coating of nickel and an outer coating of tin.

16. A module as recited in claim 14 wherein each of said standoffs comprises at least one longitudinally extending rib between said projecting ribs to increase the structural strength of each pin along the portion thereof having the standoff.

References Cited

UNITED STATES PATENTS 2,994,057 7/1961 Donohue et al. -------- 339—17

LEWIS H. MYERS, *Primary Examiner.*

H. W. COLLINS, *Assistant Examiner.*

UNITED STATES PATENT OFFICE
CERTIFICATE OF CORRECTION

Patent No. 3,331,912 July 18, 1967

Alfred A. Stricker et al.

It is hereby certified that error appears in the above numbered patent requiring correction and that the said Letters Patent should read as corrected below.

In the drawings, Sheet 1, for "3,332,912" read -- 3,331,912 --; column 7, line 15, for "connetcing" read -- connecting --.

Signed and sealed this 30th day of April 1968.

(SEAL)
Attest:

Edward M. Fletcher, Jr.
Attesting Officer

EDWARD J. BRENNER
Commissioner of Patents